(12) United States Patent
McDuff

(10) Patent No.: US 7,464,414 B2
(45) Date of Patent: Dec. 16, 2008

(54) HINGED PAD FOR PROTECTIVE GEAR

(76) Inventor: Rodrigue McDuff, 4230 Du Myosotis, St-Bruno, Québec (CA) J3V 6K2

(\*) Notice: Subject to any disclaimer, the term of this patent is extended or adjusted under 35 U.S.C. 154(b) by 0 days.

(21) Appl. No.: 11/623,357

(22) Filed: Jan. 16, 2007

(65) Prior Publication Data

US 2007/0192943 A1  Aug. 23, 2007

Related U.S. Application Data

(60) Provisional application No. 60/759,065, filed on Jan. 17, 2006.

(51) Int. Cl.
*A41D 13/00* (2006.01)
(52) U.S. Cl. .......................................................... 2/455
(58) Field of Classification Search ...................... 2/455, 2/69, 16, 24, 267, 268
See application file for complete search history.

(56) References Cited

U.S. PATENT DOCUMENTS

| | | | | |
|---|---|---|---|---|
| 3,125,762 A | * | 3/1964 | Glahe | 2/463 |
| 3,772,704 A | * | 11/1973 | Carbonneau | 2/22 |
| 4,481,679 A | * | 11/1984 | Hayes | 2/463 |
| 5,172,425 A | * | 12/1992 | Smith | 2/22 |
| 5,477,558 A | * | 12/1995 | Volker et al. | 2/461 |
| 5,701,611 A | * | 12/1997 | Rector et al. | 2/455 |

\* cited by examiner

*Primary Examiner*—Tejash Patel
(74) *Attorney, Agent, or Firm*—Ogilvy Renault LLP

(57) ABSTRACT

Hinged padding for protective gear comprises a first and a second pad member. A dual-layer membrane sandwiches the first pad member and the second pad member, between a first of the layers and a second of the layers. The first and the second pad member are separated from one another in such a way that the two layers of the dual-layer membrane are coplanar between the sandwiched pad members. The dual-layer membrane consists of a generally non-rigid material such that the first pad member and the second pad member are at least pivotable with respect to another, whereby the hinged padding is adapted to be shaped to be accommodated in a shell of protective gear. A process for assembling the hinged padding is also described.

15 Claims, 5 Drawing Sheets

HINGED PAD FOR PROTECTIVE GEAR

CROSS-REFERENCE TO RELATED APPLICATION

This patent application claims priority on U.S. Provisional Patent Application No. 60/759,065, filed on Jan. 17, 2006, by the present applicant.

BACKGROUND OF THE INVENTION

1. Field of the Invention

The present invention relates to protective gear, such as helmets, shin/knee protection, used in physical activities such as sports, and more particularly to padding used in the protective gear.

2. Background Art

Protective gear, especially of the type used in sports, has evolved over the years. The athletes have become stronger and faster, and the equipment and the play have evolved in such a way that the protective gear must constantly be improved to protect the players adequately.

For instance, in hockey, numerous head injuries have been recorded in the past decades. Helmets have therefore been modified to improve their shock absorption capacity. Accordingly, helmet padding has gone from being constituted of a few humidity-absorbing polyurethane-foam cushions glued directly to the rigid outer shell, to individual padding members each made of a shock-absorbing expanded polymer pad (e.g., expanded polypropylene) supporting a softer impermeable comfort pad interfaced between the head of the wearer and the polymer pad.

One of the issues associated with such padding members is that they require a non-negligible amount of adhesive to be connected to the rigid outer shell. Moreover, the constituting members of such padding members, i.e., the polymer pad and the impermeable comfort pad, are also glued together. This is not an optimal connection, as some padding members can get inadvertently detached. Also, the assembly of such helmets is labor-intensive. Finally, the finish of expanded padding shows traces of foam beads, and is also not optimal.

SUMMARY OF INVENTION

It is therefore an aim of the present invention to provide padding for protective gear that addresses issues associated with the prior art.

It is a further aim of the present invention to provide a process for producing hinged padding for protective gear.

Therefore, in accordance with the present invention, there is provided hinged padding for protective gear, comprising: a first pad member; a second pad member; a dual-layer membrane sandwiching the first pad member and the second pad member, between a first of the layers and a second of the layers, the first pad member and the second pad member being separated from one another in such a way that the two layers of the dual-layer membrane are coplanar between the sandwiched pad members, the dual-layer membrane consisting of a generally non-rigid material such that the first pad member and the second pad member are at least pivotable with respect to another; whereby the hinged padding is adapted to be shaped to be accommodated in a shell of protective gear.

Further in accordance with the present invention, there is provided a process for assembling hinged padding, comprising the steps of: i) positioning at least two pad members on a first membrane; ii) placing a second membrane on the at least two pad members; iii) placing a die on the second membrane such that a portion of the die is between the at least two pad members; iv) temperature treating the die such as to fuse the first membrane to the second membrane to form a hinge between the at least two pad members; whereby a hinged padding is formed upon removal of the die.

BRIEF DESCRIPTION OF THE DRAWINGS

Having thus generally described the nature of the invention, reference will now be made to the accompanying drawings, showing by way of illustration a preferred embodiment thereof and in which.

DESCRIPTION OF THE PREFERRED EMBODIMENTS

Figure 1:
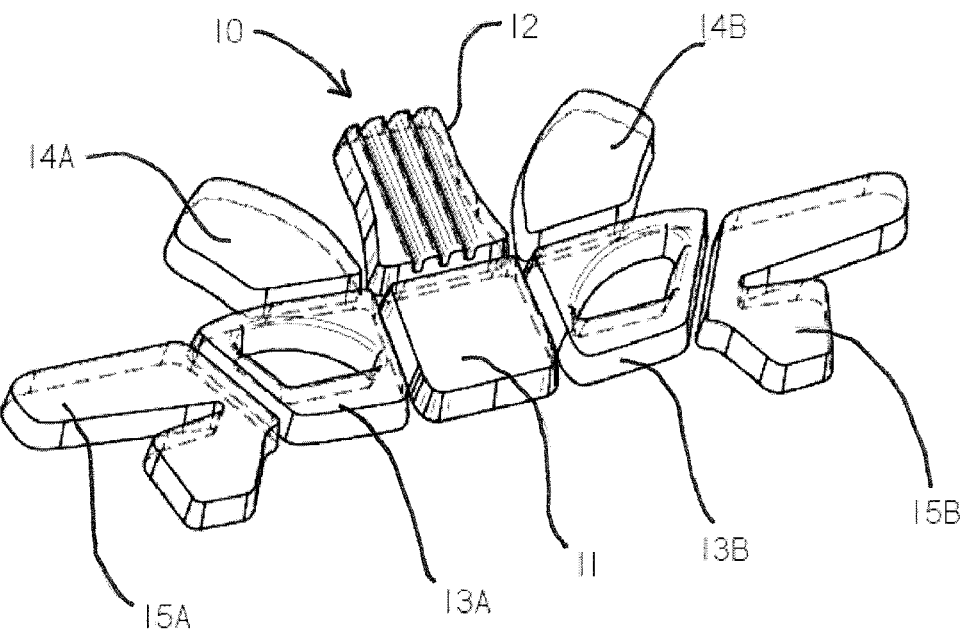
FIG. 1 is a perspective view of a hinged padding constructed in accordance with an embodiment of the present invention.
Figure 2:
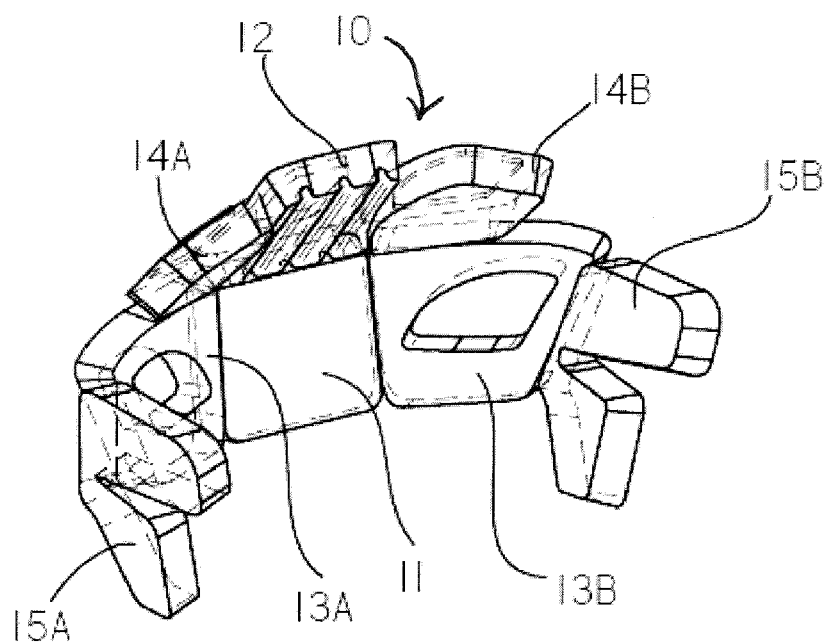
FIG. 2 is a perspective view of the hinged padding of FIG. 1, shaped so as to be inserted into a shell of protective gear.

Referring now to the drawings, and more particularly to FIGS. 1 and 2, hinged padding for protective gear in accordance with a preferred embodiment, is generally shown at 10.

The hinged padding 10 has a central lower forehead pad 11 and an upper forehead pad 12 hinged to the central lower forehead pad 11. Lateral lower forehead pads 13A and 13B are hinged to the central lower forehead pad 11. The pads 13A and 13B are each provided with an air vent.

Lateral upper forehead pads 14A and 14B are respectively hinged to the lateral lower forehead pads 13A and 13B. Temple pads 15A and 15B are respectively hinged to the lateral lower forehead pads 13A and 13B.

As is shown in FIG. 2, the hinged padding 10 is shaped with a view to being fitted in the front part of a helmet. The hinge relation between the various pads enables the padding to be shaped in accordance with the front portion of the inner cavity of the helmet. It is pointed out that although the hinged padding 10 is described as being part of a helmet, hinged padding as described herein can be used with other types of protective gear. A few other applications are described hereinafter.

Figure 3:
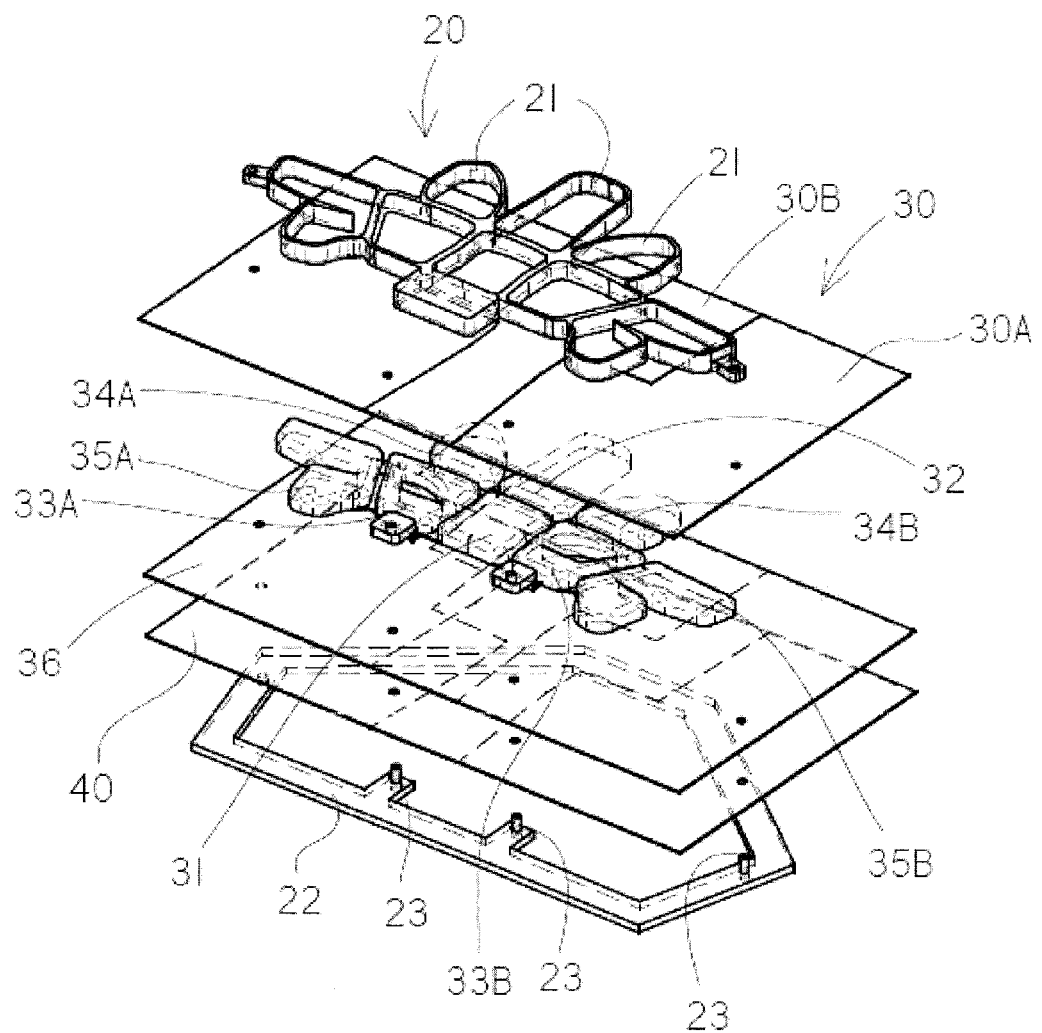
FIG. 3 is an assembly view of components of the hinged padding with respect to prior to being assembled with a die and alignment jig in accordance with another embodiment of the present invention.

Referring to FIG. 3, components of the hinged padding are illustrated in an assembly view with respect to a die 20 having cavities 21 as well as an alignment jig 22 with pins 23. More specifically, the components include a layer of membrane 30, pad members 31 to 35B, a layer 36 of adhesive, and a layer of membrane 40.

The membrane 30 is typically made of a fabric, made of natural materials, polymers or rubbers, having a suitable level of elasticity. For instance, the membrane 30 is made of a polyester. As is shown in FIG. 3, the membrane 30 may have color patterns thereon, such as colors 30A and 30B, with color 30B printed on the fabric having color A using known techniques.

Referring concurrently to FIGS. 1 to 3, the pad members are as follows: the pad member 31 will be part of the central lower forehead pad 11, the pad member 32 will be part of the upper forehead pad 12, the pad members 33A and 33B will respectively be part of the lateral lower forehead pads 13A and 13B, the pad members 34A and 34B will respectively be part of the lateral upper forehead pads 14A and 14B, and the pad members 35A and 35B will respectively be part of the temple pads 15A and 15B.

The material and the density of the pad members 31 to 35B will be selected as a function of the contemplated use of the hinged padding 10. Therefore, the hinged padding 10 may advantageously be constituted of different types of pads, each specifically suited for a bodily region to be protected. The pads are either molded or cut.

As an example, in view of the configuration of the hinged padding 10, the pad members 31 and 32 are typically made of a low-density expanded polyethylene (EPE). Similarly, the pad members 33A, 33B, 34A and 34B are typically made of a medium-density expanded polypropylene (EPP). The pad members 35A and 35B are typically made of a high-density EPE.

The adhesive 36 preferably comes in the form of a sheet as is illustrated in FIG. 3. The adhesive 36 is a thermo-reactive adhesive that will react to heat applied by a press in which the whole assembly illustrated in FIG. 3 will be inserted.

The membrane 40 is a membrane made of a polymeric or rubber material, preferably having a level of elasticity lower than that of the membrane 30.

When the various components of the hinged padding are placed atop one another so as to be laminated into the hinged padding 10, the various pad members 31 to 35B are placed into respective cavities 21 of the die 20.

The die 20 is made of a rigid material that is well suited to transferring heat, such as a metal (e.g., aluminum). The die 20 is machined or cast as a function of the peripheral shape of the hinged padding 10.

The alignment jig 22 is optionally provided so as to facilitate the alignment between the various components of the hinged padding and the die 20. It is seen from FIG. 3 that the die 20, the membrane 30, the sheet of adhesive 36, as well as the membrane 40 all have alignment holes that will accommodate the alignment pins 23. The alignment is of particular importance in the case of a dual-tone membrane 30 (such as the one illustrated in FIG. 3), to ensure that the hinged padding 10 has the desired color pattern.

Once the various components of the hinged padding 10 are layered with the die 20 and the alignment jig 22, this assembly is heat-pressed. Suitable heat-pressing depends on the type of adhesive 36 used, as well as the thicknesses of the membranes 30 and 40. For instance, a pressing time of 85 seconds at 300° F. is suitable to perform the fusing.

A seam is therefore formed between the membranes 30 and 40 in the shape of the die 20, as the adhesive 36 melts and fuses the membranes 30 and 40 to one another. It is pointed out that the adhesive 36 is optional as the membranes 30 and 40 may naturally fuse together, depending on the material chosen for these membranes. The membrane 30 stretches to conform to the shape of the pads 31 to 35B, whereas the membrane 40 remains generally flat. Therefore, the pads 31 to 35B are encapsulated between the membranes 30 and 40. It is observed that, in the hinged padding 10 formed from using the assembly illustrated in FIG. 3, there is no adhesive between the pads 31 to 35B and the membrane 30 this facilitates the stretching of the membrane 30, and enhances moisture evaporation through the membrane 30.

In the process associated with the assembly of FIG. 3, a cooling step is optionally performed by placing the assembly with or without the alignment jig 22 between cooling presses. The die 20 is then removed, at which point the outer periphery of the hinged padding 10 is defined using a die, or any other suitable cutting process whether manual or automated, so as to define the hinged padding 10 as illustrated in FIGS. 1 and 2. The cutting is however optional as the membranes 30 and 40 may already define a suitable peripheral shape for the hinged padding.

It is observed in FIG. 3 that there is a cut-out in the pads 33A and 33B. In order to have these cut-outs as illustrated in FIGS. 1 and 2, insert dies (not shown) are positioned in the cut-outs at the same layer as the die 20, so as to have the membranes 30 and 40 fuse to one another. Alternatively, the membrane 30 may cover the cut-out without being fused to the membrane 40, thereby defining an air gap between the membranes 30 and 40 in the regions of the cut-outs.

Figure 4:
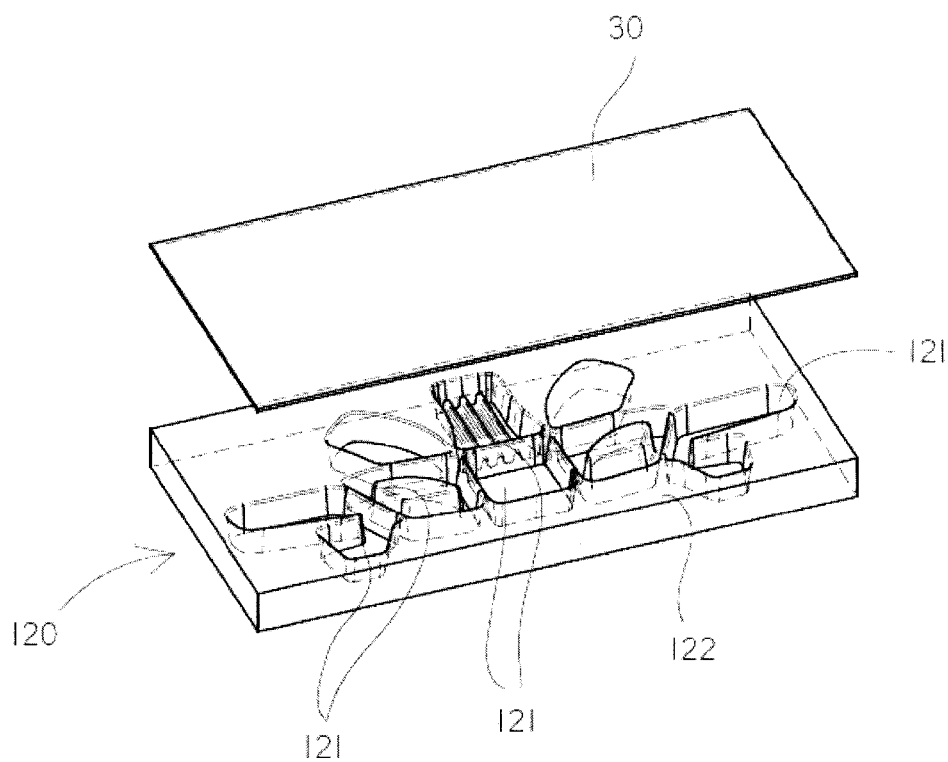
FIG. 4 is an assembly view of a membrane being positioned on a mold for a vacuum-forming step of a process in accordance with another embodiment of the present invention.
Figure 5:
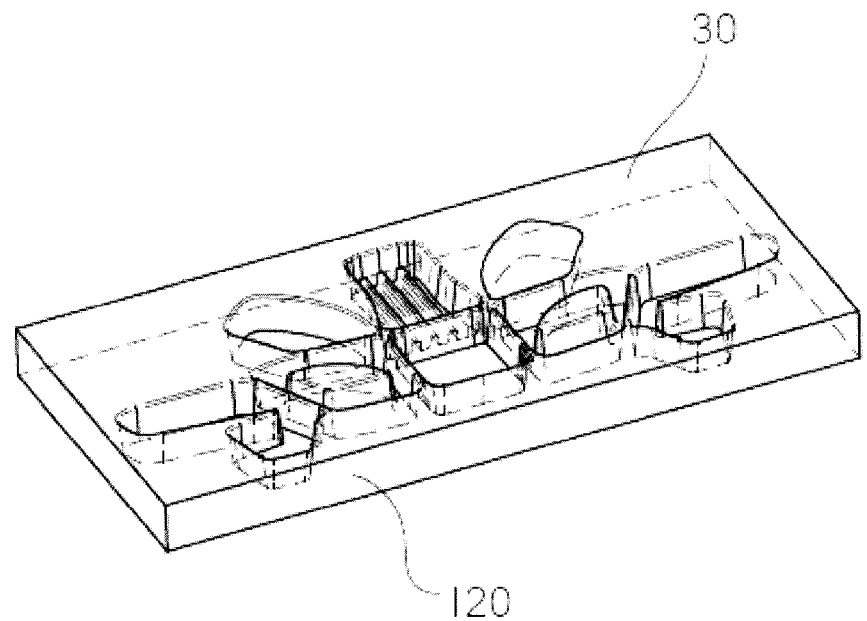
FIG. 5 is a perspective view of the membrane of FIG. 4 being vacuum-formed.
Figure 6:
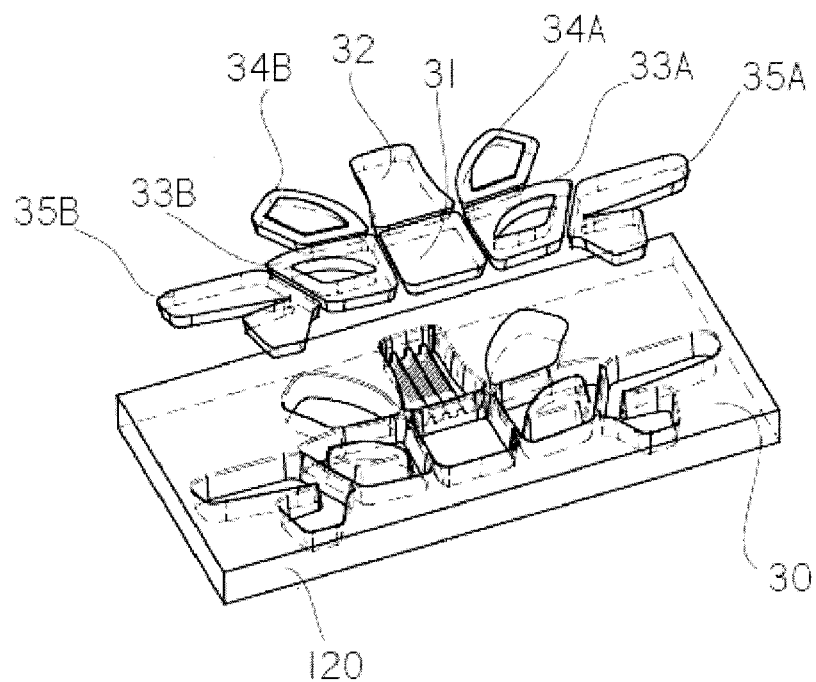
FIG. 6 is an assembly view of pad members being inserted into the vacuum-formed membrane of FIG. 5.

Referring to FIGS. 4 to 9, an alternative process for producing the hinged padding 10 is described. In FIG. 4, a mold is illustrated at 120. The mold 120 is typically made of a material adapted to sustain temperature changes. For instance, the mold 120 is typically made of aluminum. Cavities 121 are provided in an upper surface 122 of the mold 120. The cavities 121 are essentially shaped to accommodate the various pads that will be making up the hinged padding 10. The upper surface 122 is preferably provided with vacuum holes for a vacuum-forming process to be described hereinafter.

The membrane 30 is positioned on the upper surface 122 of the mold 120.

By way of a vacuum-forming process, the membrane 30 takes the shape of the upper surface 122 of the mold 120. To initiate the vacuum-forming process, the membrane 30 is heated, and vacuuming is actuated for the vacuum holes in the upper surface 122 of the mold. The combination of heat and suction results in the membrane 30 taking the shape of the upper surface 122 of the mold 120.

Figure 7:
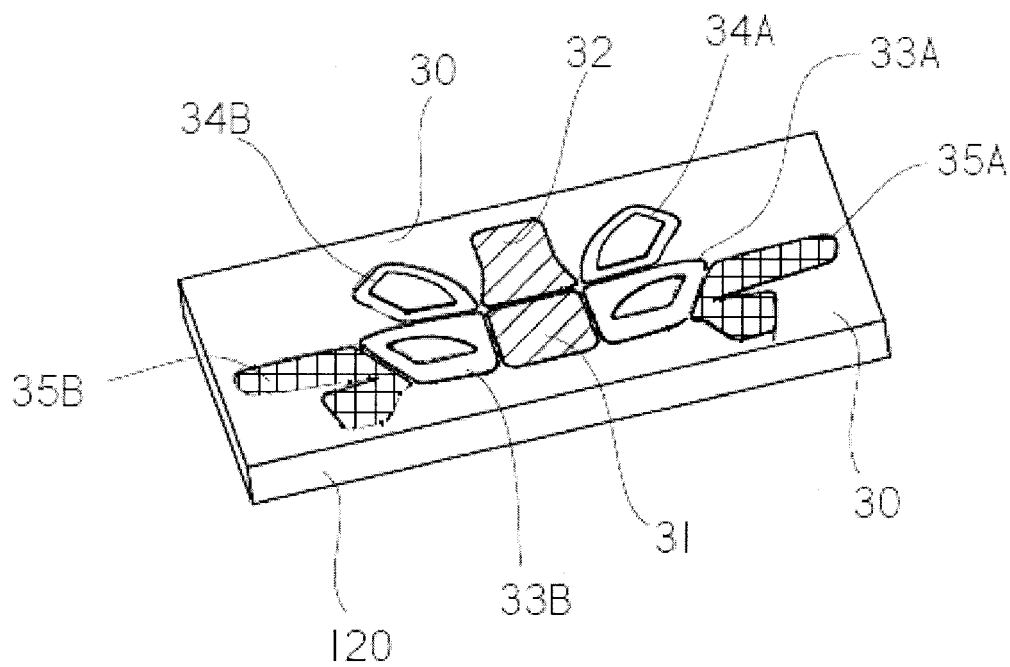
FIG. 7 is a perspective view of the pad members as inserted into the vacuum-formed membrane of FIG. 5.

Thereafter, pad members are inserted into the cavities 121 of the mold 120, upon which still lies the vacuum-formed membrane 30. Referring concurrently to FIGS. 1, 2, 6 and 7. It is considered to add an adhesive on the vacuum-formed membrane 30, in the cavities 121, to secure the pad members 31-35B to the membrane 30. There is illustrated in FIG. 7 the vacuum-formed membrane 30 accommodating the pad members 31-35B. It is considered to have components molded into the pad members. For instance, tapped-bore inserts may be encapsulated in the pad members.

Figure 8:
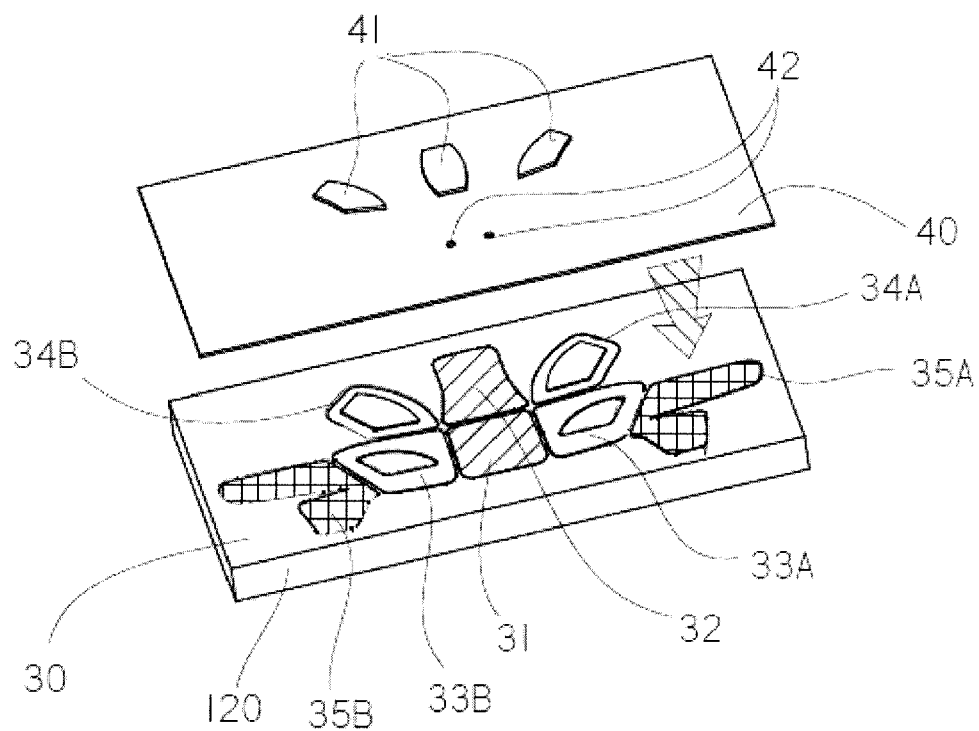
FIG. 8 is an assembly view of an additional membrane being positioned on the pad members/vacuum-formed membrane assembly of FIG. 7.

Referring to FIG. 8, a membrane 40 is positioned on top of the combination of the membrane 30/pad members 31-35B. The membrane 40 will be fused to the membrane 30, by being pressed against the membrane 30 (by a heated press plate not shown in FIG. 8).

In a preferred embodiment, the materials of the membranes 30 and 40 are compatible so as to be fused to one another. Alternatively, an adhesive, such as a glue, may be used to secure the membranes 30 and 40 together.

As is seen in FIG. 8, the membrane 40 may be provided with connection components 41, such as Velcro™ strips.

There is also illustrated in FIG. 8 holes 42 in the membrane 40, which holes 42 are in register with inserts in the pad member 31.

Figure 9:
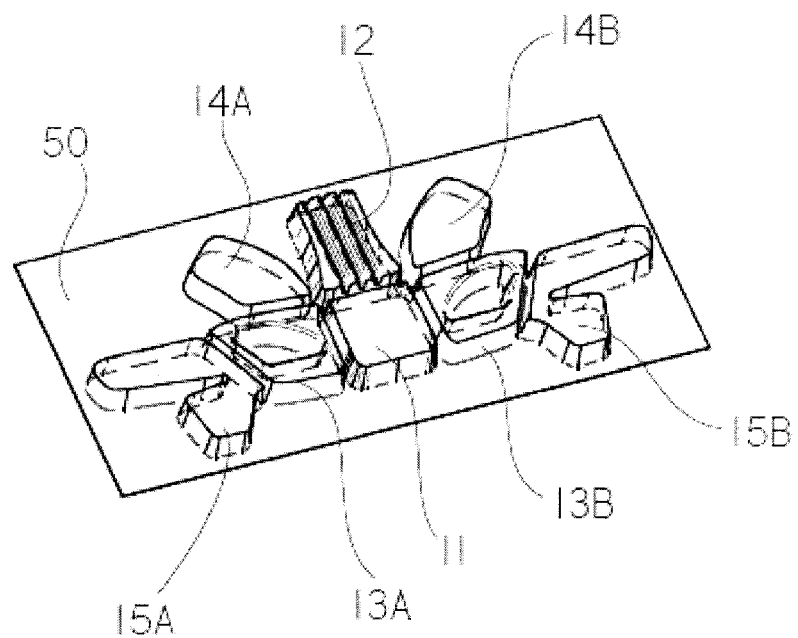
FIG. 9 is a perspective view of an assembly after the step illustrated in FIG. 8.

Once the membranes 30 and 40 are bonded together with the pad members 31 to 35B encapsulated therein to form assembly 50, the assembly 50 is removed from the mold 120, as shown in FIG. 9. The assembly 50 is then trimmed or die-cut into the hinged padding 10. As understood from the process, the pad members forming the pads of the hinged padding 10 are hinged by the material of the membranes 30 and 40 interrelating the pad members. This enables the relative movement between the pads 11 to 15B of the hinged padding 10, to enable the hinged padding 10 into the geometry illustrated in FIG. 2.

Applications for the hinged padding 10 includes non-exclusively padding for the limbs and for the torso for any contact sport. As an example, hockey goaltender equipment such as a torso guard may be constructed using some of the hinged padding 10, as the hinging action between the pads allows the hinged padding to conform to the body shape of the user person.

The invention claimed is:

1. Hinged padding for protective gear, comprising:
   a first pad member;
   a second pad member;
   a dual-layer membrane sandwiching the first pad member and the second pad member, between a first of the layers and a second of the layers, the first pad member and the second pad member being separated from one another in such a way that the two layers of the dual-layer membrane are coplanar between the sandwiched pad members, the dual-layer membrane consisting of a generally non-rigid material such that the first pad member and the second pad member are at least pivotable with respect to one another;
   an adhesive layer on the first layer for coplanar engagement of the two layers between the sandwiched pad members, with the second of the two layers stretching to conform to a shape of the pad members, and for adhering engagement of the pad members to the first layer;
   whereby the hinged padding is adapted to be shaped to be accommodated in a shell of protective gear.

2. The hinged padding according to claim 1, wherein the first pad member and the second pad member are respectively made of a first material and of a second material.

3. The hinged padding according to claim 2, wherein the first material and the second material are respectively expanded polymers of a first and of a second density.

4. The hinged padding according to claim 1, wherein the two layers are joined in coplanar relation using the adhesive.

5. The hinged padding according to claim 1, wherein the adhesive is a film of adhesive coplanar with the first of the two layers.

6. The hinged padding according to claim 1, wherein the layers are made of polyester.

7. The hinged padding according to claim 1, wherein at least one of the pad members has a cavity such that an air volume is encapsulated between the layers and a surface of the cavity of the pad member.

8. The hinged padding according to claim 1, wherein the first of the layers has at least two colors.

9. The hinged padding according to claim 8, wherein a portion of the first of the layers covering a first one of the pad elements is in a first color, and another portion of the first of the layers covering a second one of the pad elements is in a second color.

10. A process for assembling hinged padding, comprising:
    positioning a sheet of adhesive on a first membrane;
    positioning at least two pad members on the first membrane;
    placing a second membrane on the at least two pad members;
    placing a die on the second membrane to bring the membranes together between the at least two pad members;
    temperature treating the die such as to activate the adhesive between the first membrane and the second membrane to form a hinge between the at least two pad members;
    whereby a hinged padding is formed upon removal of the die.

11. The process according to claim 10, wherein temperature treating the die involves heating and cooling the die.

12. The process according to claim 10, wherein positioning at least two pad members involves positioning the at least two pad members with respect to an alignment jig, and placing a die involves aligning the die with the alignment jig.

13. The process according to claim 10, further comprising cutting a periphery of the membranes to define a periphery of the hinged padding.

14. The process according to claim 10, wherein placing the die comprises conforming the second membrane to sides and a top surface of the at least two pad members, while a bottom surface of the at least two pad members and the hinge are coplanar with the first membrane.

15. The process according to claim 10, wherein temperature treating comprises activating the adhesive to adhere a bottom surface of the pad members to the first membrane.

* * * * *